INVENTOR.
Robert W. Heid, Jr.,
BY
Davis, Lindsey, Hibben + Noyes
Attys.

United States Patent Office 2,893,801
Patented July 7, 1959

2,893,801

PISTON RING ASSEMBLY

Robert W. Heid, Jr., Richmond, Ind., assignor to Perfect Circle Corporation, Hagerstown, Ind., a corporation of Indiana Application June 11, 1956, Serial No. 590,517

3 Claims. (Cl. 309—45)

The invention relates generally to piston rings and more particularly to a piston ring assembly.

For use as an oil ring on a piston of an internal combustion engine, a piston ring assembly frequently employed comprises one or more cylinder-engaging rails and a combined spacer-expander for holding the rail or rails in the desired position in the piston ring groove of the piston and for forcing the rail or rails outwardly into engagement with the cylinder wall with sufficient pressure. When two such rails are used, the combined spacer-expander holds them spaced apart adjacent the respective sides of the groove.

A rail of the type herein contemplated is a thin washer-like element provided with a gap to permit it to contract and expand and having a radial width many times its axial thickness. The outer edge of the rail engages the cylinder wall and is preferably rounded in cross section.

A rail, when free, expands to a size that is greater than the bore of the cylinder in which it is to operate, and the rail must therefore be compressed when inserted in the cylinder. A rail of the size heretofore generally used has sufficient radial width so that, when it is assembled with the combined spacer-expander in the groove in the piston, it will be held at least partially within the groove throughout its periphery, even when in its free state before being placed in the cylinder and even though the assembly is pushed in to the groove at one side of the piston until it contacts the bottom of the groove. Thus, even though the rail is pushed into the groove at one side of the piston until it contacts the bottom of the groove, at least a portion of the rail at a point diametrically opposite remains in the groove. Consequently, the rail is held properly positioned for compressing it on inserting the piston in the cylinder.

A rail of such radial width is quite stiff, but if a rail of less radial width were used to reduce the stiffness and the combined spacer-expander were correspondingly reduced in radial width, the assembly when pushed into the groove at one side of the piston until it contacts the bottom of the groove would permit the entire radial width of the rail, and even the spacer-expander, to lie wholly outside of the groove at the diametrically opposite point. Difficulties would then be encountered in compressing the rail on inserting the piston into the cylinder because the rail and spacer-expander would not be held in proper relation to each other and to the sides of the groove. The reduced radial width of the spacer-expander would also render it less stable and make it subject to twisting or tilting in the groove so that it would not properly cooperate with the rail or rails.

The general object of the invention is to provide a novel piston ring assembly having a rail or rails which are radially narrower than those heretofore usually employed, but which are held properly positioned within the groove, even when free, so that no difficulties are encountered in compressing them on inserting the piston into the cylinder.

More specifically, it is an object to provide a piston ring assembly comprising a spacer-expander and a pair of rails narrower than those heretofore usually employed but which are held at least partially within the groove throughout their entire circumference, when free, so that they may be readily compressed in proper relation to the spacer-expander and to the sides of the groove.

Another object is to provide a piston ring assembly of the foregoing character, in which the spacer-expander provides a side pressure on the rails at the inner peripheries thereof to effect a seal with the sides of the groove.

A further object is to provide a novel combined spacer and expander for use with rails that are narrower than those normally employed.

Still another object is to provide a novel spacer-expander for use with rails of reduced radial width, the spacer-expander being so constructed that it cannot twist or tilt when assembled with its rails in a piston ring groove.

Other objects and advantages will become apparent from the following description taken in connection with the accompanying drawing in which.

Figure 1:
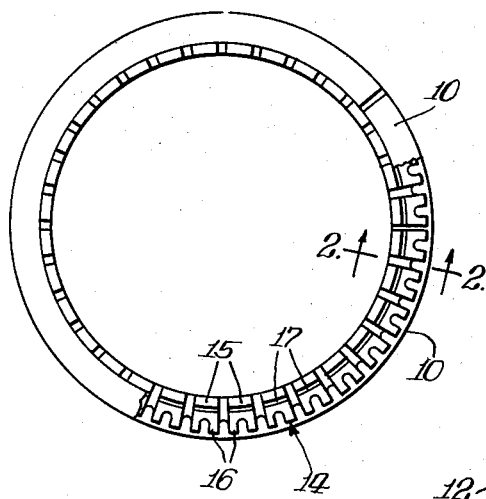
Fig. 1 is a plan view of a piston ring assembly embodying the features of the invention.

As heretofore mentioned, a piston ring assembly embodying the features of the invention permits the use of rails which are radially narrower than those usually employed. The narrower rails are more flexible and hence more readily conform to the shape of the cylinder under the expanding force exerted by the spacer-expander means. The narrower rails with a correspondingly narrow spacer-expander, however, would cause difficulties in placing a piston with such a ring assembly thereon in a cylinder, if the groove in the piston were of ordinary depth. Such difficulty arises because of the fact that, before being placed in the cylinder, the ring assembly is free to shift eccentrically in the groove relative to the piston. Thus, if the ring assembly at one side of the piston were pushed completely into the groove until it contacted the bottom thereof, the narrow rail, and even a narrow spacer-expander, would lie entirely outside of the groove at the diametrically opposite side of the piston. This would cause difficulty on compressing the assembly for insertion into the cylinder because the rails at said opposite side would not be held against distortion by the sides of the groobe. Moreover, the spacer-expander might tend to twist or tilt in the groove. This difficulty is not encountered with rails and spacer-expanders of ordinary radial width because the rails, when pushed into the groove at one side of the piston, lie partially within the groove at the opposite side and thus are held in proper position when compressed for insertion into the cylinder. Also, the spacer-expander does not twist or tilt because its radial width is sufficient to prevent such difficulty.

A ring assembly embodying the features of the invention permits the use of the narrower rails but avoids the difficulties just mentioned. To this end, the spacer-expander used in the assembly is provided with a portion extending inwardly from the inner peripheries of the rails, said portion being of such radial width as to make the overall width of the assembly substantially equal to the radial width of a ring assembly using rails of ordinary width. Such a spacer-expander is provided with offsets at its sides, which are spaced from the inner periphery of the spacer-expander, the offsets providing outwardly facing shoulders engaging the rails to force them outwardly. With this construction the rails are held at least partially within the groove throughout their entire periphery and thus are maintained properly positioned when compressed for insertion into the cylinder. Moreover, the spacer-expander has sufficient radial width to prevent it from twisting or tilting in the groove.

The preferred embodiment of the invention shown in the drawing comprises a pair of axially spaced rails 10 shown as having rounded outer edges adapted to engage the wall of a cylinder, indicated at 11, the rails 10 being located adjacent the respective sides of a ring-receiving groove 12 in a piston 13. To hold the rails 10 axially spaced and to force them radially outward a combined spacer-expander means, indicated generally at 14, is provided. In the present instance, the spacer-expander means 14 is shown as one which is of the circumferentially expanding type. Thus, it is shown as being made from a strip of sheet metal, which is transversely slotted alternately from opposite edges of the strip to provide segments 15 and connecting web members 16. The strip is bent along longitudinally extending lines to form a U-shaped section with the segments in two axially spaced rows and is also formed into a circle with the arms of the U extending radially inward.

The rails 10, in this instance, are radially narrower than those usually employed. However, to avoid permitting the rails to shift completely out of the groove 12 at one side of the piston when the ring assembly is pushed into the groove at the opposite side of the piston, the segments 15 extend inwardly beyond the rails 10 a substantial distance so that the overall radial width of the assembly is substantially the same as that of an assembly using the ordinary width rails. In order to provide for outward expansion of the rails, the segments 15 are provided with outwardly facing shoulders 17 engaging the inner peripheries of the rails. The shoulders 17 are provided by offsets 20 formed by bending the segments first axially outward and then radially inward. The offsets 20 are thus radially spaced from the inner periphery of the spacer-expander, and the portions of the segments inwardly of the offsets 20 are spaced axially farther apart than are the portions outwardly of the offsets.

Figure 2:
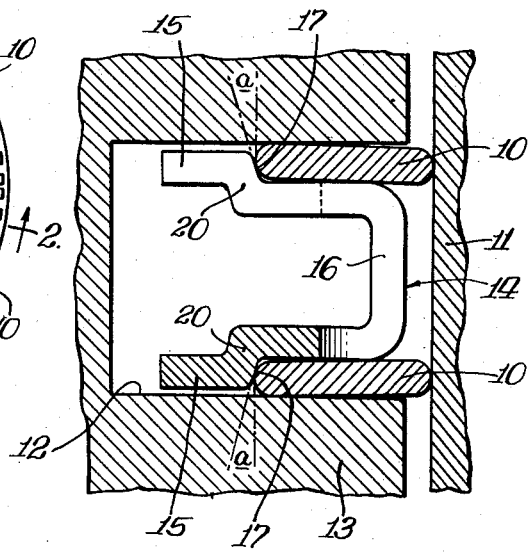
Fig. 2 is an enlarged sectional view taken on the line 2—2 of Fig. 1 and showing the assembly mounted on a piston in a cylinder.
Figure 3:
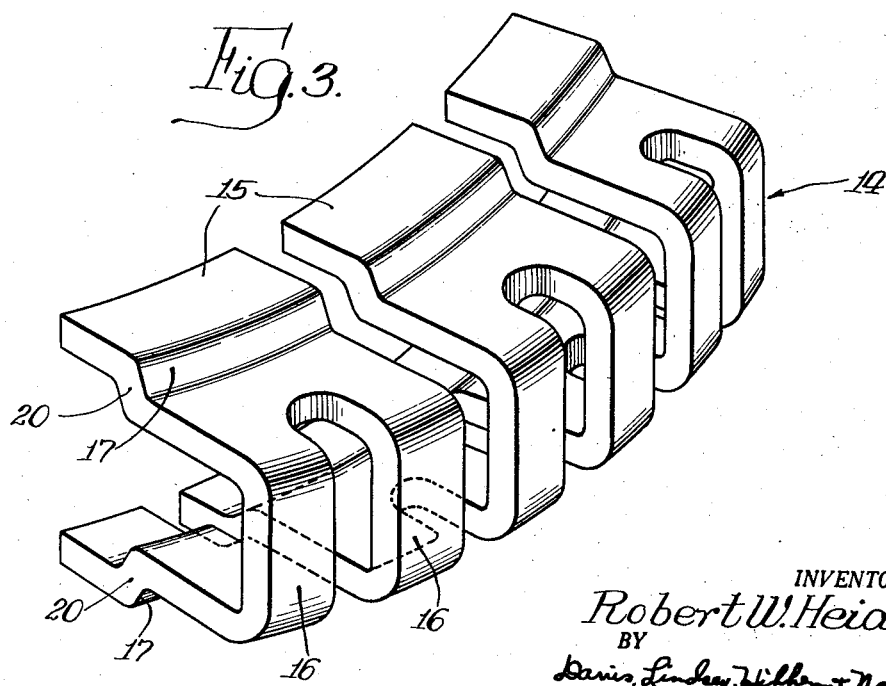
Fig. 3 is a fragmentary perspective view of the spacer-expander means forming part of the ring assembly.

The present construction also provides for the so-called "side seal" of the rails 10. Thus, the inner peripheries of the rails are forced axially against the sides of the groove, tending to cause the rails to dish. They thus provide a seal to prevent oil from being drawn from the groove into the combustion space of the cylinder when a high vacuum condition exists therein during part of the engine cycle. For this purpose, the shoulders 17 are formed at an angle to the rails as indicated at $a$ in Fig. 2. Such angle is preferably between 12 degrees and 17 degrees to a line parallel to the axis of the piston. With such an angle, the force exerted by the spacer-expander has an axial component forcing the inner peripheries of the rails against the sides of the groove. While both of the rails are shown as dished in Fig. 2, the forces acting on them may cause them to lie flat against the adjacent sides of the groove during parts of the engine cycle, but at all times the inner peripheral portions of the rails are held against the sides of the groove.

From the foregoing description, it will be apparent that I have provided a novel piston ring assembly which permits the use of rails that are radially narrower than those usually employed. With this construction, the rails will be held at least partially within the groove throughout their entire periphery and thus cannot distort when compressed for insertion into the cylinder. Furthermore, the spacer-expander has sufficient radial width to prevent it from twisting or tilting in the groove.

I claim:

1. A piston ring assembly adapted to be mounted in a groove in a piston and comprising a cylinder-engaging rail, and positioning and expanding means comprising a U-shaped member formed from a strip of uniform thickness having its arms extending inwardly with one arm engaging the rail to hold it on one side of the groove, said one arm having an offset portion formed by bending the arm axially and then radially inward to provide a shoulder spaced from its free end and engaging the inner periphery of the rail to force it outwardly, said one arm extending inwardly from said offset to increase the radial width of the assembly, the inward extension of said one arm being of such radial dimension that, when the inner edge of said extension at one point thereon abuts the bottom of the groove before the ring assembly is compressed, at least a portion of the rail at a diametrically opposite point lies within the groove.

2. A piston ring assembly adapted to be mounted in a groove in a piston and comprising a pair of axially spaced rails, and a spacer-expander made of sheet metal of uniform thickness and comprising a U-shaped member extending between the rails and having its arms extending inwardly, said arms being bent axially outward intermediate their ends to provide radially outwardly facing shoulders engaging the inner peripheries of the rails to force them outwardly, said arms being further bent to extend inwardly from said shoulders to increase the radial width of the assembly, the inward extensions of said arms being of such radial dimension that, when the inner edges of said extensions at one point thereon abut the bottom of the groove before the ring assembly is compressed, at least portions of both rails at a diametrically opposite point lie within the groove.

3. A combined spacer-expander for a piston ring assembly including a pair of rails, comprising a member formed from a strip of uniform thickness and being U-shaped in radial cross-section with the arms of the U extending inwardly, said arms having offset portions spaced outwardly from their inner ends and formed by an axially extending bend and a radially inward extending bend and providing outwardly facing shoulders adapted to engage the respective rails, said arms thereby extending inwardly from said shoulders with the inward extensions having such radial dimension that, when the inner ends of the arms at one point on the inner periphery thereof abut the bottom of the groove before the ring assembly is compressed, at least portions of the rails at a diametrically opposite point lie within the groove.

References Cited in the file of this patent

UNITED STATES PATENTS

| 2,695,825 | Estey | Nov. 30, 1954 |
| 2,713,527 | Hsia-Si Pien | July 19, 1955 |